C. C. WHITTAKER.
SYSTEM OF CONTROL.
APPLICATION FILED MAY 27, 1916.

1,275,811.

Patented Aug. 13, 1918.

WITNESSES:
R. J. Fitzgerald
W. R. Coley

INVENTOR
Charles C. Whittaker
BY
ATTORNEY

United States Patent Office.

CHARLES C. WHITTAKER, OF WILKINSBURG, PENNSYLVANIA, ASSIGNOR TO WESTINGHOUSE ELECTRIC AND MANUFACTURING COMPANY, A CORPORATION OF PENNSYLVANIA.

SYSTEM OF CONTROL.

1,275,811.

Specification of Letters Patent.

Patented Aug. 13, 1918.

Application filed May 27, 1916. Serial No. 100,289.

*To all whom it may concern:*

Be it known that I, CHARLES C. WHITTAKER, a citizen of the United States, and a resident of Wilkinsburg, in the county of Allegheny and State of Pennsylvania, have invented a new and useful Improvement in Systems of Control, of which the following is a specification.

My invention relates to systems of control and especially to the control of dynamo-electric machines through the agency of electrolyte-employing rheostats.

One object of my invention is to provide, in a system of the above-indicated character, a rheostat of the type mentioned which shall embody means independent of the electrolyte for varying the effective resistance of the rheostat under predetermined conditions.

More specifically stated, it is an object of my invention to provide, in conjunction with the main electrodes that are usually employed in liquid rheostats, a plurality of auxiliary, relatively high-resistance electrode circuits that are utilized under "flush-level" conditions only, the auxiliary circuits being rendered inoperative by a predetermined rise in the electrolyte level.

It is a well-known fact that, when tapered ends of electrodes or relatively small plates are immersed in an electrolyte, the resistance between the plates does not continuously increase directly with the distance of separation, but, beyond a certain length of electrolyte path, the resistance increases almost negligibly. Consequently, in cases where it is necessary to employ a relatively high voltage between electrodes and a comparatively heavy current flow, the desired circuit resistance under "flush-level" or starting conditions may be obtained in two ways without exceeding the permissible current density at the working surfaces of the electrodes: viz. either by lengthening the path of the current through the electrolyte, as set forth and claimed in a co-pending application of Arthur J. Hall and myself, Serial No. 136,033, filed Dec. 9, 1916, or by inserting resistors of fixed value in circuit with auxiliary electrodes at starting, whereby the desired resistance conditions are obtained, and the subsequent rise of electrolyte level will short-circuit or render inoperative the auxiliary electrode circuits, as hereinafter set forth in detail.

Figure 1:
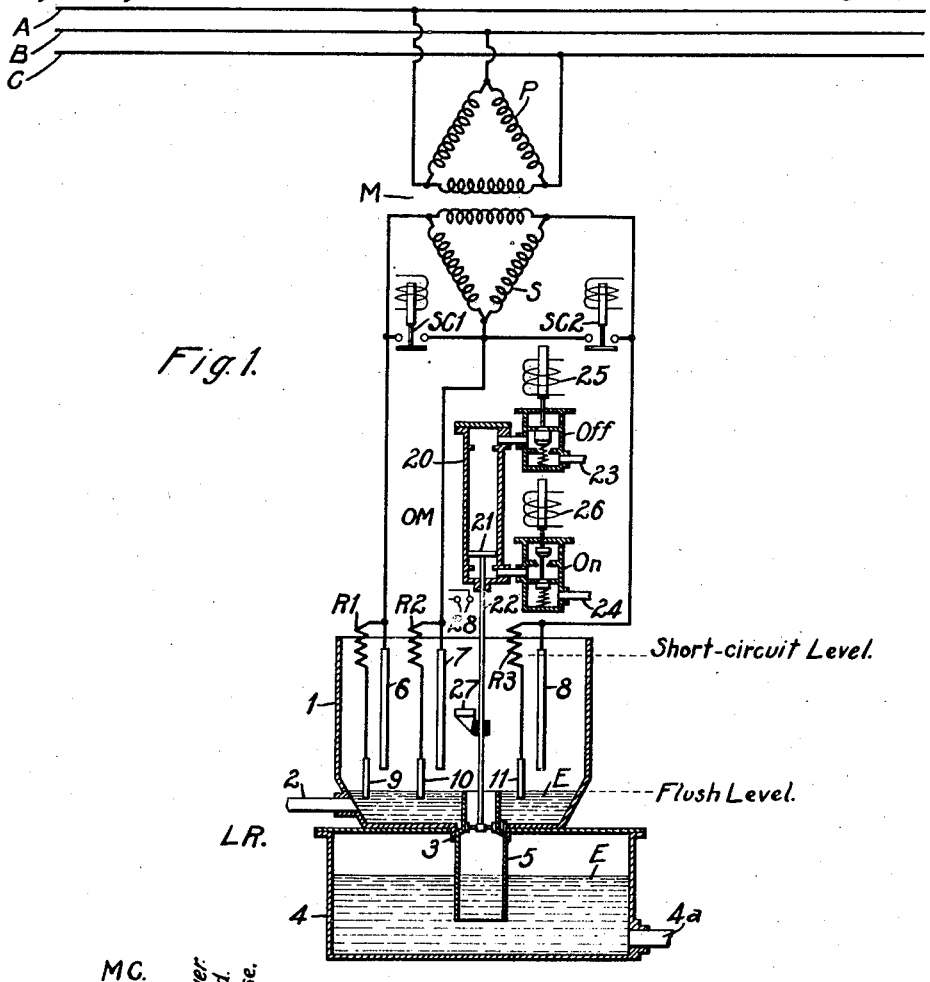
Figure 2:
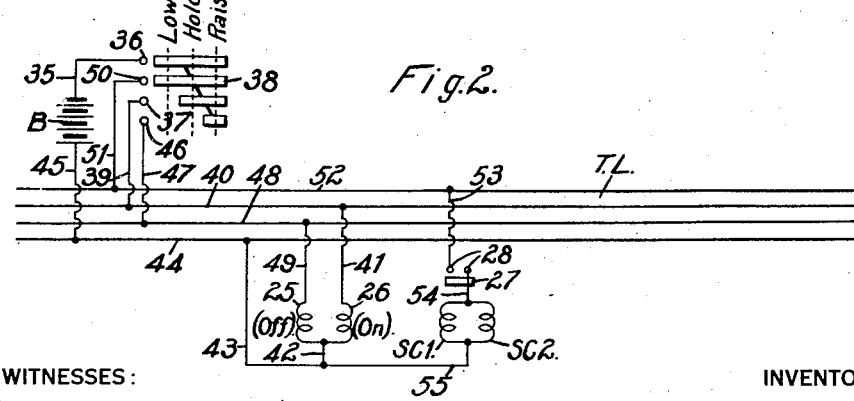

My invention may best be understood by reference to the accompanying drawing, wherein Figure 1 is a diagrammatic view of the main circuits of a system of control embodying my invention; and Fig. 2 is a diagrammatic view of an auxiliary governing system for manipulating the main-circuit connections in the desired manner.

Referring to Fig. 1, the system here shown comprises a plurality of polyphase supply-circuit conductors A, B and C that are respectively connected to the terminals of the primary winding P of a polyphase induction driving motor M, the secondary winding S of which is adapted to be governed by a liquid rheostat LR, in accordance with the movements of an operating mechanism OM. A plurality of short-circuiting switches SC¹ and SC² for the secondary winding S are employed under conditions to be described, and a plurality of auxiliary resistors R¹, R² and R³ are associated with the liquid rheostat LR for a purpose to be set forth.

It will be understood that any suitable arrangement of the primary and the secondary windings of the induction motor M, other than the delta connections shown, may be employed, if desired, inasmuch as the particular motor connections are immaterial to my present invention.

The liquid rheostat LR, in general, may be of any well-known type and is here shown as comprising an electrolyte-containing tank 1 which is provided with a side inlet opening 2 and a central bottom discharge opening 3 which communicates with a suitable reservoir 4 having a side outlet opening 4ª. The electrolyte E in the tank 1 and in the reservoir 4 may be circulated in any well-known manner, as by means of a centrifugal pump (not shown) but, since such construction is not pertinent to my present invention, I have not deemed it necessary to show or describe any such arrangement.

A combined discharge and regulating valve 5 slides within the discharge opening 3 and, when in the illustrated position, is adapted to effect a rise of the electrolyte level to the line which is indicated as "Flush-level". Lowering the valve 5 will cause the discharge of the electrolyte E from the tank 1 to the reservoir 4 through suitable openings that are formed, whereas, raising the valve will effect a corresponding rise of electrolyte level in the tank 1, as hereinafter described in detail.

Inasmuch as the particular construction of the combined discharge and regulating valve 5 is immaterial to my present invention, except in so far as it performs certain necessary functions therein, it is not believed necessary to describe the valve specifically. The preferred structure is fully set forth and claimed in a co-pending application of A. J. Hall, Serial No. 873,919, filed November 25, 1914, and assigned to the Westinghouse Electric & Manufacturing Company, to which reference may be made for a more detailed description.

The liquid rheostat LR is provided with the customary-main-circuit electrodes 6, 7 and 8 that are respectively connected to the terminals of the secondary induction motor winding S, in accordance with a familiar practice. However, in addition to the main electrodes, auxiliary or starting electrodes 9, 10 and 11 are employed and are connected in series relation with the several resistors $R^1$, $R^2$ and $R^3$ to the upper terminals of the respective main electrodes 6, 7 and 8. In this figure, connections between the lower portions of the main electrodes and the corresponding auxiliary electrodes is opened by reason of the relative location of the pairs of main and auxiliary electrodes, but it will be understood that, upon a predetermined rise of electrolyte level in the tank 1, as set forth in detail later, such connections will be established; or, in other words, the auxiliary electrodes will be connected in series relation with the corresponding auxiliary resistors across, that is to say, in parallel relation to the allied main electrodes. The illustrated or normal arrangement of main and auxiliary electrodes may, therefore, be termed an "open-parallel" relation.

The operating mechanism OM is preferably of a familiar electrically-controlled, pneumatically-operated type comprising a suitable operating cylinder 20 within which is a piston 21, the rod or stem 22 of which is suitably associated with the combined discharge and regulating valve 5 to effect vertical movement thereof in the one or the other direction. A pair of electrically-controlled valves, respectively marked "Off" and "On", are adapted to communicate with the respective ends of the operating cylinder 20.

The valve "On" is of a well-known type which normally is closed to connect the lower end of the cylinder 20 with the atmosphere and to prevent the access of fluid pressure to the cylinder from any suitable source (not shown) through a pipe or passage 24. On the other hand, the "Off" valve is of an inverted type which is normally open to admit fluid-pressure through a pipe or passage 23 to the upper end of the operating cylinder 20 to thus bias the mechanism to its lowest position, and to close communication between the cylinder and the atmosphere. An actuating coil 25 is provided for the "Off" valve and, when energized, effects the release of fluid-pressure from the upper end of the cylinder 20, while the access of fluid-pressure thereto through the pipe 23 is cut off.

The "On" valve is provided with an actuating coil 26, which, when energized, moves the valve to a position wherein fluid-pressure is admitted to the lower end of the cylinder 20 through the pipe 24, and the communication of the lower end of the cylinder 20 to the atmosphere is closed.

To effect the upward movement of the piston 21 and, consequently, of the combined discharge and regulating valve 5, the two actuating coils 25 and 26 are simultaneously energized, as described in detail in connection with Fig. 2, to effect the above-described functions, whereupon the reversal of initial unbalanced-pressure conditions effects an upward movement of the piston 21. To arrest movement of the piston at any desired point, the actuating coil 25 is deënergized to produce balanced-pressure conditions on opposite sides of the piston 21 and thus positively and reliably hold the piston wherever desired. To effect a return movement of the piston 21, it is merely necessary to deënergize both actuating coils 25 and 26, whereupon the initial unbalanced-pressure conditions again obtain to bias the piston 21 to its lowest position.

The operation of the liquid rheostat LR, without regard to the auxiliary governing circuits, may be set forth as follows: With the piston 21 and the combined discharge and regulating valve 5 in their respective lowest positions, the level of the electrolyte in the tank 1 is below the line marked "Flush-level", and neither the main nor the auxiliary electrodes are connected through the electrolyte. By suitable manipulation of the operating mechanism OM, as hereinbefore described, the combined discharge and regulating valve 5 is actuated to the "flush-level" position shown, wherein the auxiliary electrodes 9, 10 and 11 are partially immersed. The secondary circuits of the induction driving motor M are thus completed, and, upon connections of the primary winding P to the supply-circuit conductors A, B and C, the acceleration of the induction motor will begin.

Under "flush-level" conditions, therefore, the resistance of the liquid rehostat LR is materially increased over the resistance that would obtain if the main electrodes 6, 7 and 8 were employed, for a purpose previously set forth. However, as the electrolyte level rises within the tank 1 to a predetermined degree, the main electrodes 6, 7 and 8 are actively connected in circuit, thereby simultaneously effecting a substantial short-circuit of the auxiliary electrode circuits. From that time on, the operation of the liquid rheostat may be governed in any well-known manner to effect a suitable acceleration of the main induction motor M, as will be understood.

When the electrolyte level reaches the line marked "Short-circuit level", near the top of the main electrodes 6, 7 and 8, a switching device or interlock 27 that is rigidly associated with the piston rod 22 bridges a pair of stationary contact members 28, for a purpose to be described in connection with Fig. 2.

The auxiliary governing system that is illustrated in Fig. 2 comprises a master controller MC that is adapted to occupy a plurality of operative positions respectively marked "Lower", "Hold", and "Raise", signifying the corresponding action of the operating mechanism OM; the actuating coils 25 and 26 of the "Off" and the "On" valves and of the switches $SC^1$ and $SC^2$, which coils are connected through a plurality of suitable train-line conductors TL to the master controller MC; and a source of energy, such as a battery B, for energizing the various actuating coils.

Assuming that the combined discharge and regulating valve occupies its lowest or fully discharged position, the actuation of the master controller MC to its position marked "Raise" will effect the establishment of an auxiliary circuit from one terminal of the battery B through conductor 35, control fingers 36 and 37, which are bridged by contact segment 38 of the master controller, conductor 39, train-line conductor 40, conductor 41, actuating coil 26 of the "On" valve, conductors 42 and 43, train-line conductor 44 and conductor 45 to the other terminal of the battery B. A simultaneous circuit is completed from the contact segment 38 of the master controller through control finger 46, conductor 47, train-line conductor 48, conductor 49, actuating coil 25 of the "Off" valve and thence through conductor 42 as just recited. The controlling valves "Off" and "On" of the operating mechanism OM are thus actuated to their other positions to effect an upward movement of the piston 21 and the combined discharge and regulating valve 5, first to the "flush-level" position that is illustrated and subsequently to higher positions to effect a corresponding rise of electrolyte level in the manner already described.

When the level marked "Short-circuit level" is reached, the movable contact member or interlock 27 bridges the stationary contact members 28, as hereinbefore stated, whereby an auxiliary circuit is completed from the contact segment 38 of the master controller through control finger 50, conductor 51, train-line conductor 52, conductor 53, the stationary contact members 28, which are now bridged by the movable contact member 27, conductor 54, the parallel-related actuating coils of the short-circuiting switches $SC^1$ and $SC^2$ and conductor 55 to the negatively-connected conductor 43. The switches $SC^1$ and $SC^2$ are thus closed, at the end of the accelerating period, to completely short-circuit the secondary winding S of the induction motor M, in accordance with a familiar practice.

To arrest the movement of the combined discharge and regulating valve 5 at any desired point, the master controller MC may be actuated to its intermediate position marked "Hold", whereby the actuating coil 25 of the "Off" valve is deënergized and balanced-pressure conditions obtain upon opposite sides of the piston 21. Actuation of the master controller to its position "Lower" or to its "Off" position effects the deënergization of both actuating coils 25 and 26 and, consequently, the piston 21 and the combined discharge and regulating valve 5 are returned through the positions corresponding to "Flush-level" to their respective lowest positions.

I do not wish to be restricted to the specific circuit connections or location and construction of parts herein set forth, as various modifications thereof may be effected without departing from the spirit and scope of my invention. I desire, therefore, that only such limitations shall be imposed as are indicated in the appended claims.

I claim as my invention:

1. In a system of control, the combination with a dynamo-electric machine and an electrolyte-employing rheostat for governing the operation thereof, of means other than the electrolyte for varying the effective resistance of the rheostat under predetermined conditions.

2. In a system of control, the combination with a dynamo-electric machine and an electrolyte-employing rheostat for governing the operation thereof, of means other than the electrolyte for increasing the effective resistance of the rheostat under "flush-level" conditions.

3. In a system of control, the combination with a dynamo-electric machine and an electrolyte-employing rheostat for governing the operation thereof, of means other than the electrolyte for varying the effective resistance of the rheostat under predetermined conditions, said means being rendered inoperative by a predetermined variation of electrolyte level.

4. In a system of control, the combination with a dynamo-electric machine and an electrolyte-employing rheostat for governing the operation thereof, of means other than the electrolyte for increasing the effective resistance of the rheostat under "flush-level" conditions, said means being rendered inoperative by a predetermined rise of electrolyte level.

5. In a system of control, the combination with a dynamo-electric machine and an electrolyte-employing rheostat for governing the operation thereof and embodying a plurality of main electrodes, of a plurality of auxiliary electrode circuits of materially different resistance value from said main electrodes, and means for utilizing said auxiliary electrode circuits under predetermined conditions.

6. In a system of control, the combination with a dynamo-electric machine and an electrolyte-employing rheostat for governing the operation thereof and embodying a plurality of main electrodes, of a plurality of auxiliary electrode circuits of materially higher resistance value than said main electrodes, and means for utilizing said auxiliary electrode circuits under "flush-level" conditions.

7. In a system of control, the combination with a dynamo-electric machine and an electrolyte-employing rheostat for governing the operation thereof and embodying a plurality of main electrodes, of a plurality of auxiliary electrode circuits of materially different resistance value from said main electrodes, and means for utilizing said auxiliary electrode circuits under predetermined conditions, said circuits being rendered inoperative by a predetermined variation of electrolyte level.

8. In a system of control, the combination with a dynamo-electric machine and an electrolyte-employing rheostat for governing the operation thereof and embodying a plurality of main electrodes, of a plurality of auxiliary electrode circuits of materially higher resistance value than said main electrodes, and means for utilizing said auxiliary electrode circuits under "flush-level" conditions, said circuits being rendered inoperative by a predetermined rise of electrolyte level.

9. In a system of control, the combination with a dynamo-electric machine and an electrolyte-employing rheostat for governing the operation thereof and embodying a plurality of main electrodes, of a plurality of auxiliary electrode circuits of materially different resistance value from, and respectively normally connected in open-parallel relation to, said main electrodes, and means for utilizing the auxiliary electrode circuits alone or the closed parallel electrode circuits in accordance with the electrolyte level.

10. In a system of control, the combination with a dynamo-electric machine and an electrolyte-employing rheostat for governing the operation thereof and embodying a plurality of main electrodes, of a plurality of auxiliary electrode circuits of materially higher resistance value than, and respectively connected in open-parallel relation to, said main electrodes, and means for utilizing the auxiliary circuits alone under "flush-level" conditions, a predetermined rise of electrolyte level serving to close the previously open parallel electrode circuits.

11. In a system of control, the combination with a dynamo-electric machine and an electrolyte-employing rheostat for governing the operation thereof and embodying a plurality of main electrodes, of a plurality of sets of series-related auxiliary electrodes and translating devices respectively connected in open-parallel or closed-parallel relation with the respective main electrodes in accordance with the electrolyte level.

12. In a system of control, the combination with a dynamo-electric machine and an electrolyte-employing rheostat for governing the operation thereof and embodying a plurality of main electrodes, of a plurality of sets of series-related auxiliary electrodes and resistors respectively connected in open-parallel relation with the respective main electrodes under "flush-level" conditions and in closed-parallel relation therewith under predetermined higher-level conditions.

In testimony whereof, I have hereunto subscribed my name this 17th day of May 1916.

CHARLES C. WHITTAKER.